Fig. 1

INVENTOR.
TAKEZO TAKADA

April 8, 1969  TAKEZO TAKADA  3,437,537
METHOD AND APPARATUS FOR MAKING TUBES OF WOVEN FIBER IMPREGNATED
BY A HIGH POLYMERIC COMPOUND
Filed Dec. 28, 1964

INVENTOR.
TAKEZO TAKADA
BY
Kurt Kelman
Agent

United States Patent Office 3,437,537
Patented Apr. 8, 1969

3,437,537
METHOD AND APPARATUS FOR MAKING TUBES OF WOVEN FIBER IMPREGNATED BY A HIGH POLYMERIC COMPOUND
Takezo Takada, 1741 Oaza Hikotomi, Iai-cho, Echi-gun, Shiga-ken, Japan
Filed Dec. 28, 1964, Ser. No. 421,307
Claims priority, application Japan, June 9, 1964, 39/32,396; June 10, 1964, 39/32,607; Aug. 31, 1964, 39/48,655; Sept. 10, 1964, 39/51,029
Int. Cl. B32b 25/04; B29c 17/04
U.S. Cl. 156—149                          9 Claims

ABSTRACT OF THE DISCLOSURE

Manufacture of a woven fabric tube impregnated by a high polymeric compound, wherein the fibers are dried and deaired prior to impregnation by the compound and wherein the impregnated tube is heated under conditions of controlled internal and external air pressure to effect proper penetration of the fabric by the compound.

---

The present invention relates to the art of manufacturing fiber-incorporated high polymeric compound tubes which comprise high polymeric compounds as principal components and fibers concentrically incorporated therein, and more particularly to large diameter synthetic tubes in which coarsely woven fabrics are concentrically incorporated into the walls of tubular high polymeric compounds and which have physical properties such as seamless toughness, high inner pressure-resistance, light weight and high flexibility; an improved method for preparing such synthetic tubular products in a substantially unlimited length, and an apparatus suitable for carrying out such a method.

Up to now, such tubes have been produced by a method in which a fabric is adhesively applied onto the surface of a tube formed from a high polymeric compound such as natural rubber, synthetic rubber, vinyl resin or polyethylene, and the thus fabric-applied tube is dried. Alternatively, such tubes were made by a method in which a solution of a high polymeric compound is applied onto the surface of a tube formed from tightly woven fibers such as cotton, hemp and synthetic fibers and the thus compound applied fabric tube is subjected to heat treatment. Either one of the above methods is repeated until a desired multi-layer tube product is obtained. Such multi-layer tubes are now on the market.

This type of tubular products are required to have the following general properties:

(1) High resistance against pressure and impact, and light weight.
(2) Substantial length without seams, and easiness in handling, folding and rolling.
(3) Freedom from damage even when employed in a condition similar to water-hammering or when flattened by external pressure, with the capability of restoring their original shape immediately after removal of the external force which caused to deform them.
(4) Capability of allowing flow of unset concrete, dirt, sand, and powdery materials with less inner resistance against the flow of such substances, and great abrasion resistance.
(5) Freedom from damage and layer separation even when subjected to repeated bending.
(6) Availability as substitutions for metallic tubes and hume pipes, and capability of being formed as tubes having relatively large diameters and relatively light weights for easiness of transport.
(7) Usefulness in sea water, muddy water and chemicals for a long period, and easiness in installation.

However, the prior art fabric-incorporated high polymeric compound tubes have the following disadvantages which make them difficult to satisfy the above-mentioned requirements. The disadvantages of the prior art products will be described in connection with the above requirements item by item as follows.

(a) Increase in pressure-resistance inevitably increases the number of layers and weight for a multi-layer tube and stiffens the tube to an extent that handling of the same becomes inconvenient.

(b) Difficulty in obtaining a substantially long seamless tube having properties such as high pressure-resistance, light weight flexibility and toughness.

(c) A tube having a high pressure resistance capable of withstanding an action similar to water-hammering becomes heavier in weight and stiffer as mentioned in the above (a) and also becomes likely to break down because of its lessened elongation percentage.

(d) Difficulty in obtaining a light weight long tube having properties such as high pressure-resistance and abrasion resistance and smooth inner peripheral surface.

(e) Since gas and impurities (oil and grease) within the fabric texture can not be perfectly removed therefrom and incorporation of fabric into high polymeric compound is not satisfactory when such a multi-layer tube is repeatedly bent, the layers of the tube will inevitably separate from each other.

(f) Because of the reasons described in the above (a), a tube having a high pressure resistance and a heavy weight is not easy to handle, and a long tube has to be formed by joining short length tube sections together. Thus formed long tubes are now on the market, but no long tubes having a high pressure resistance, large diameter and light weight have been produced.

(g) Prior art strong multi-layer tubular products which comprise tightly woven fabrics as principal component lack in waterproof and chemical resistance properties whilst long prior art tubular products which comprise high polymeric compound as principal component are susceptible to damages by adverse weather conditions. Accordingly the service life of such tubular products is relatively short and both types of the above mentioned prior tubular products can not be produced in large diameters.

Accordingly, one object of the present invention is to facilitate manufacture of substantially unlimited lengths of synthetic high polymeric compound tubes comprising high polymeric compound as principal component and fabric texture concentrically incorporated therein, which tubes possess the above-mentioned general properties unobtainable in the prior art products such as toughness, light weight, flexibility, less inner pressure resistance and seamlessness while eliminating the above disadvantages inherent to the prior art tubular products.

Another object of the present invention is to provide a method for producing such synthetic tubular products.

Another object of the present invention is to provide an apparatus for preparing such synthetic tubular products.

According to the present invention, a synthetic tubular product is prepared by the method in which high polymeric compound is adhered to the inner and outer surfaces of a concentric fabric texture and is also permeated into the openings between the fibers of the fabric itself so as to form a fiber-incorporated high polymeric compound tube wherein the inner and outer surfaces of the tube are smoothened. Such synthetic tubular products are produced by either one of the following two methods.

According to the first method, a tubular high polymeric compound body is preformed and then a coarsely woven suitable fabric is concentrically incorporated into the wall of the tube. According to the second method, suitable fibers are previously woven into a tubular fabric and then the fabric tube is impregnated with high polymeric compound. By either the first or the second method, a tubular fabric is continuously and concentrically incorporated into the wall of a high polymeric compound tube and at the same time the inner and outer surfaces of the fiber-incorporated tube are formed so as to provide uniform and smooth surfaces.

The first method of the novel synthetic tube production method by the present invention comprises the steps of forming a tubular high polymeric compound body by extrusion of a molten high polymeric compound from an annular opening formed in a cylindrical nozzle under pressure, said molten high polymeric compound having been previously mixed with plasticizer in a suitable amount under presence of a suitable solvent and having a suitable viscosity; applying a coarsely woven fabric onto the surface of the tube, said fabric having been fully deaired and dried so as to form a tubular fabric body tightly adhering to the tubular compound surface; impregnating the tubular fabric with a solution of a mixture of an invasion accelerator such as surface active agent or plasticizer and high polymeric compound in a small amount sufficient to give a viscosity to prevent the accelerator from flowing out in order to accelerate the incorporation of the fabric into the high polymeric compound; expanding the diameter of the tubular body by applying pressure to the inside thereof and heating the accelerator mixture until the mixture has a viscosity sufficient to cause the fabric to invade the tubular high polymeric compound body with assistance of the expanding action of the tubular body whereby to locate the fabric in a predetermined concentric position within the polymeric compound body, such as closer to or further away from the outer surface of the tubular body; and heat-treating the fabric incorporated tube at a pressure and a forming rate adjusted to smoothen the outer and inner surfaces of the tubular body, whereby a tubular synthetic product having uniformity in regard to shape, wall thickness, unit weight and smoothness can be continuously produced.

The second method comprises the steps of feeding a length of coarsely woven seamless or jointless tubular fabric in a flattened state; pouring plasticizer into the tubular fabric at a hole formed at a suitable point in the upper portion thereof while the lower portion thereof is pinched between nipple rollers so as to expand the tubular fabric and adhere the plasticizer to the inner surface of the fabric; heat-setting the plasticizer adhered to the fabric inner surface and contained within the tubular fabric as the fabric is passed upwardly through the apparatus in its expanded state or heat-setting the tubular fabric in an expanded state after plasticizer has been poured into the fabric tube, or alternatively heat-setting the tubular fabric while expanding the tubular fabric; deairing the tubular fabric; impregnating the tubular fabric with a mixture of high polymeric compound and plasticizer in a suitable amount and at the same time encircling the tubular fabric with the mixture; expanding the diameter of the thus treated tubular fabric at a suitable temperature and a pressure difference between within and outside of the tubular fabric in the same manner as described in connection with the first method so as to smoothen the inner and outer surfaces of the tubular fabric and to concentrically locate the tubular fabric in a suitable position within the tubular body such as closer to or further away from the outer surface of the tubular body; and heating the thus formed synthetic tubular body whereby a desired synthetic tubular product having uniformity in regard to shape, wall thickness, unit weight and smoothness. Such free transfer of a high molecule compound solution between the inner and outer surfaces of a tubular fabric body via openings between the fibers of the fabric body by a pressure difference between the outside and inside of the tubular difference between the described in our co-pending Japanese patent application No. 51,029/1964 filed on Sept. 10, 1964.

The foregoing and other objects, features and advantages of the present invention will become apparent from the following detailed description of specific embodiments thereof and from the accompanying illustrative drawings wherein.

Figure 1:
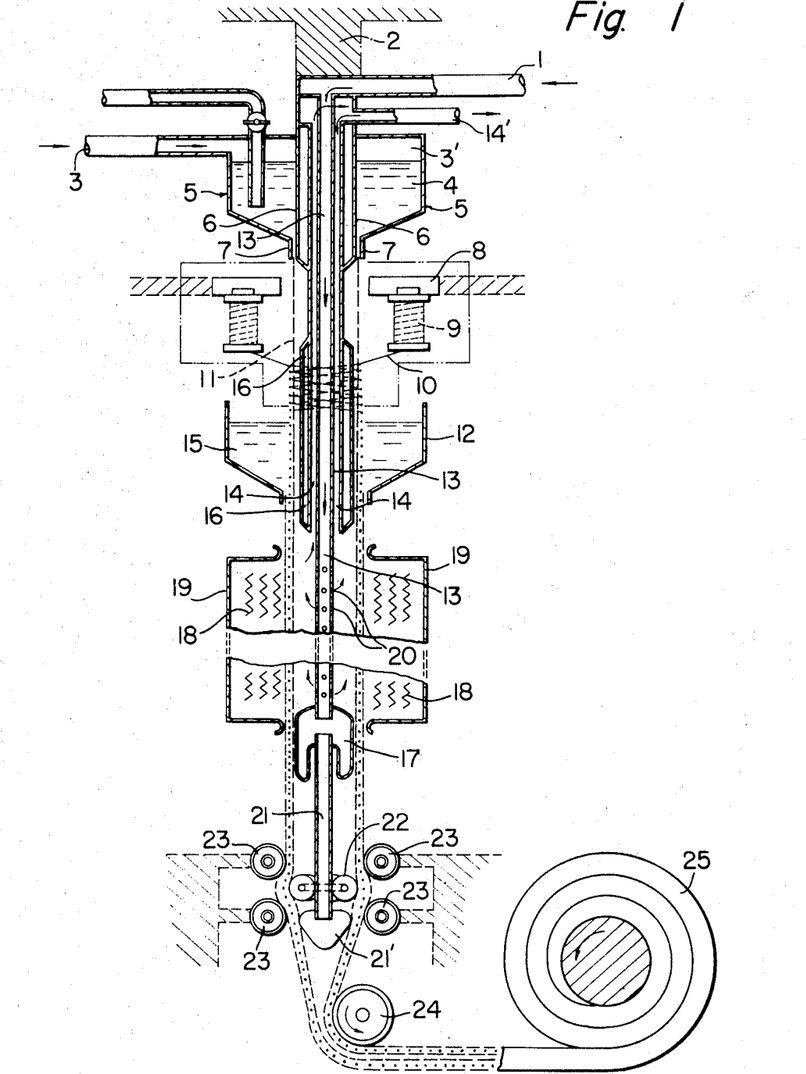
FIG. 1 is a vertical sectional view of a preferred embodiment of the apparatus suitable for carrying out the first method of the present invention.
Figure 2:
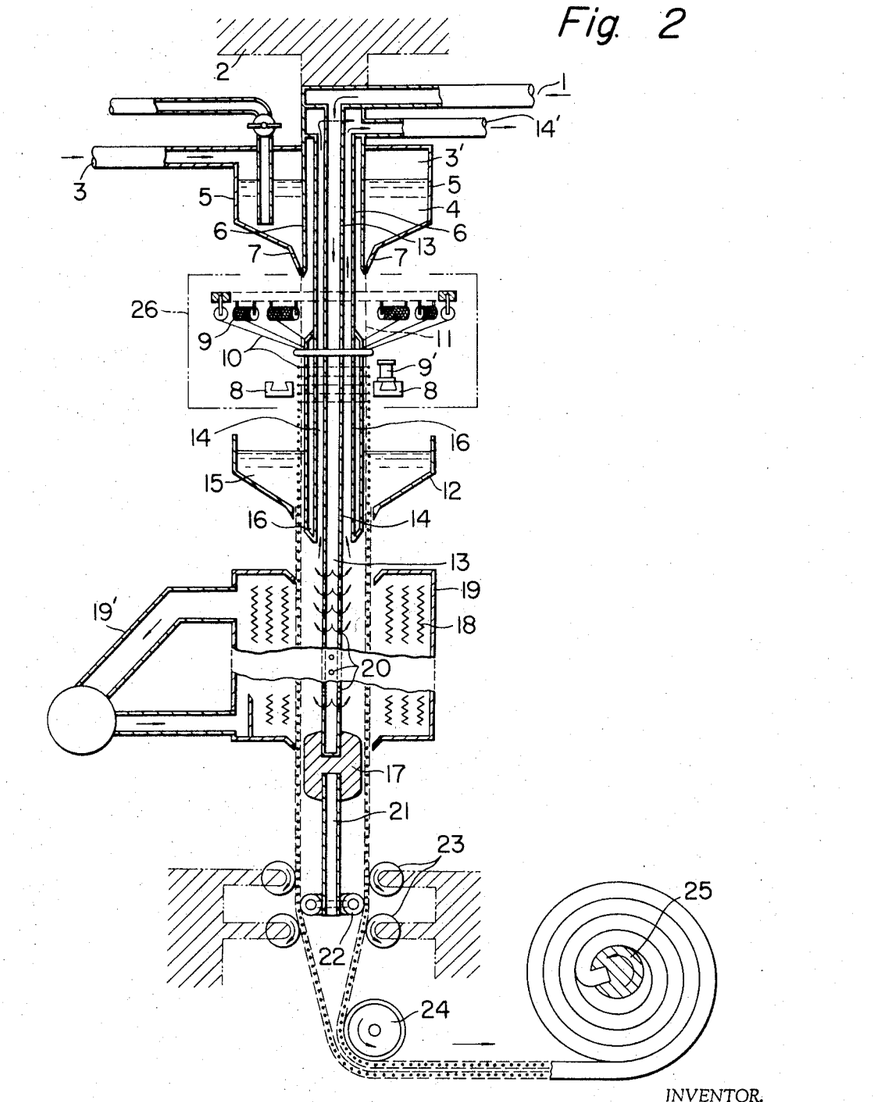
FIG. 2 is a vertical sectional view of a modified apparatus of the present invention for carrying out the method.

Reference is now made to the accompanying drawings in detail, particularly to FIGS. 1 and 2. In these figures, 1 designates an outer air pressure inlet for adjusting a pressure difference between inside and outside of a tubular synthetic body passing through the center of a cylindrical guide cylinder 16, 2 is a mounting member for supporting the guide means cylinder 16 of the apparatus, 3 is an inlet for introducing a suitable molten flow of high polymeric compound 4 under pressure into the apparatus, 5 is an annular reservoir for containing the molten high molecular compound 4, 6 is a cylindrical guide wall, 7 is a lower annular reservoir wall for extruding the molten compound in a tubular form in cooperation with the guide wall 6, 8 is a movement control frame of a circular tube weaving machine, 9 are fiber supply bobbins for the machine, 10 are fibers which are reeled out from the bobbins 9 and are woven around the outer surface of high polymeric compound as the compound is being formed into a tubular body 11, 12 is a reservoir for containing a mixture solution 15 comprising an invasion accelerator (for instance solvent or surface active agent) and a small amount of high polymeric compound which mixture accelerates the invasion of a tubular fabric knitted or woven from the fibers 10 into the wall of the high polymeric compound tube, 13 is a center air passage tube which supports the intermediate guide cylinder 16 and a lower guide cylinder 17 and which is attached to the mounting member 2 to be supported thereby, 18 is a heat treatment heater positioned between the intermediate guide cylinder 16 and the lower guide cylinder 17, 19 is a housing the heater 18, 20 are air holes provided in the center air passage tube 13 and opening into the housing 19. The air passage tube 13 is adapted to vent gas generated within a synthetic tubular body being formed through an upper exhaust opening 14' of a double-walled vent tube 14 disposed around the air passage tube 13 and at the same time to introduce fresh air into the apparatus via the outer air inlet 1. 21 is a tubular support pillar for supporting a tubular high polymeric compound body which has been formed and heat-treated, 21' is a guide cylinder for receiving and guiding the tubular compound body in cooperation with the pillar 21, 22 are guide rollers for guiding the completed tubular synthetic high polymeric compound body in contact the inside thereof, 23 are guide rolls for guiding the tubular compound body in contact with the outside thereof and for preventing the compound body from moving laterally, 24 is a pressure roller for compressing the completed synthetic tubular product to a predetermined shape flattened, 25 is a recoiler roll on which the product is to be rolled, and 26 is a deairing box.

In operation, a supply of high polymeric compound solution 4 having a suitable viscosity contained in the reservoir 5 is extruded from the space formed between the cylindrical wall 6 and the lower annular, wall 7 of the reservoir 5 under pressure supplied by a compressor (not shown) via the inlet 3 so as to form a tubular high polymeric compound body 11 having a desired wall thickness which is determined by the space between the cylindrical wall and the annular lower reservoir wall 7. The compound tubular body 11 is then passed along the inner surface of the intermediate guide cylinder 16 where dehydrated and deaired fibers 10 passing from the bobbins 9 are wound around the tubular high polymeric compound body 11 so as to form a tubular fabric layer on the high polymeric compound tube 11. The fabric wound high polymeric compound tubular body 11 is then passed through the annular reservoir 12 containing a mixture of the above-mentioned accelerator and a small amount of high polymeric compound 15 so as to form a tubular accelerator-impregnated synthetic layer on the body 11. The synthetic walled tubular body is then introduced into the heater 18 within the housing 19 and flow of fresh air is supplied against the inside of the tube via the air holes 20 in the wall of the center air passage tube 13 so as to expel moistured gas generated within the tube body so that a pressure difference and a difference in temperatures between the inside and outside of the tube are properly controlled. The diameter of the thus produced tube is expanded with the pressure differential and temperature difference and the tubular fabric is concentrically press-fitted into the expanded tubular body. The thus obtained synthetic tubular product is then smoothened on its inner and outer surfaces. The surface-smoothened tube is then heat-treated and gradually cooled to obtain the finished product which is then flattened and rolled on the recoiler roll 25.

FIG. 2 shows a modified embodiment of the apparatus for carrying out the first method. The embodiment of FIG. 2 is substantially the same as the embodiment of FIG. 1 except that the modified embodiment is employed in conjunction with a specific fabric tube weaving machine as described and shown in our co-pending Japanese patent application No. 12,488/1962 filed on Mar. 30, 1962 for an invention entitled "Method for Preparation of Reinforced Tubular Bodies and Apparatus for Carrying Out Said Method." The tube weaving machine employed in this modified embodiment is to weave fibers into a tubular fabric which is suitable to impart a most effective pressure-resistance, toughness and flexibility to a woven fabric, instead of a bag shape or circular shape fabric formed around the tubular high polymeric compound tube by the conventional circular weaving machine.

FIGS. 3, 3a, 3b and 3c show a further modified embodiment of the apparatus suitable for carrying out the second method and this type of apparatus has been described in detail in our co-pending Japanese patent application No. 6,822/1963 filed on Feb. 11, 1963. In these figures, 101 is a length of tubular fabric which has been previously woven by a suitable tubular fabric weaving machine. This tubular fabric has been rolled on a supply roll 127 from which it is supplied through guide rolls 102 and 103 to the apparatus of the modified embodiment.

Figure 3:
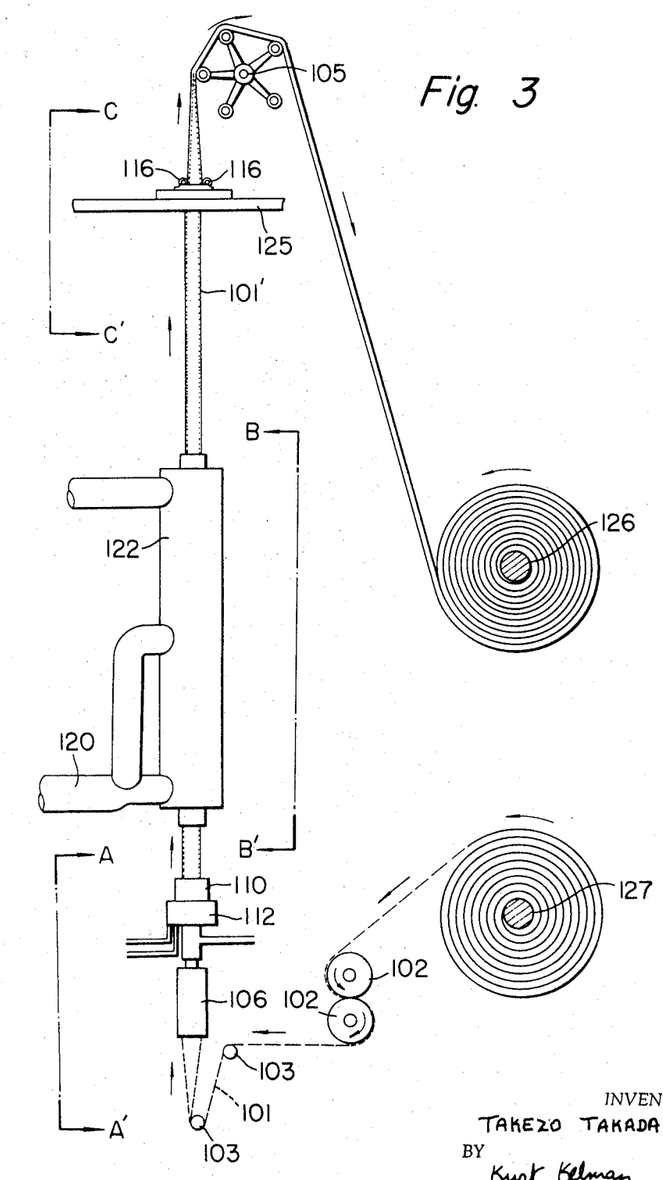
FIG. 3 is a schematic elevational view of an apparatus suitable for carrying out the second method of the present invention.
Figure 3A:
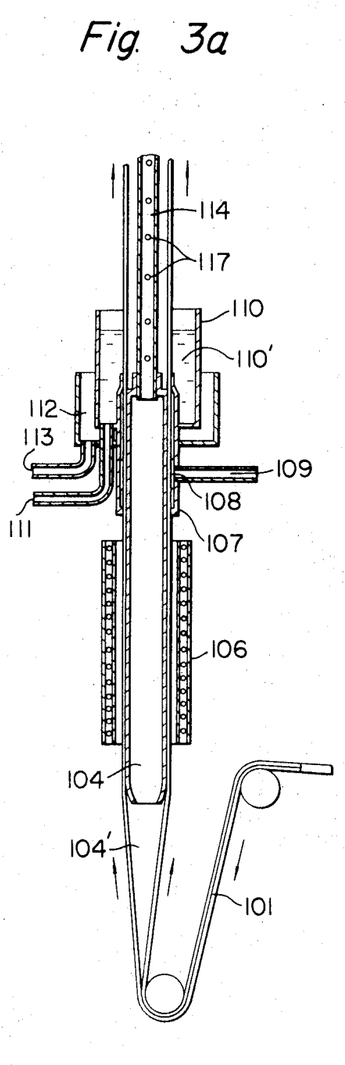
FIG. 3a is an enlarged cross-sectional view taken along generally from the line A–A' of FIG. 3.
Figure 3B:
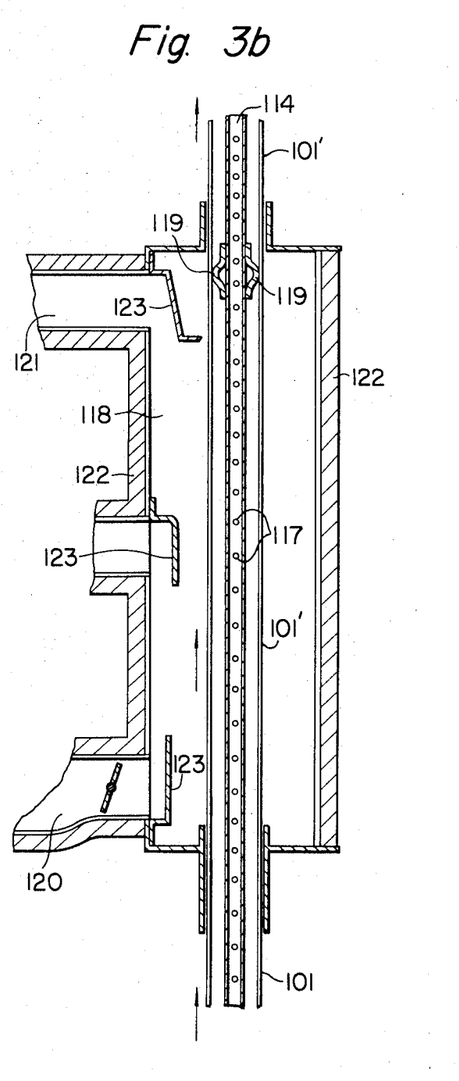
FIG. 3b is an enlarged cross-sectional view taken along generally from the line B–B' of FIG. 3.
Figure 3C:
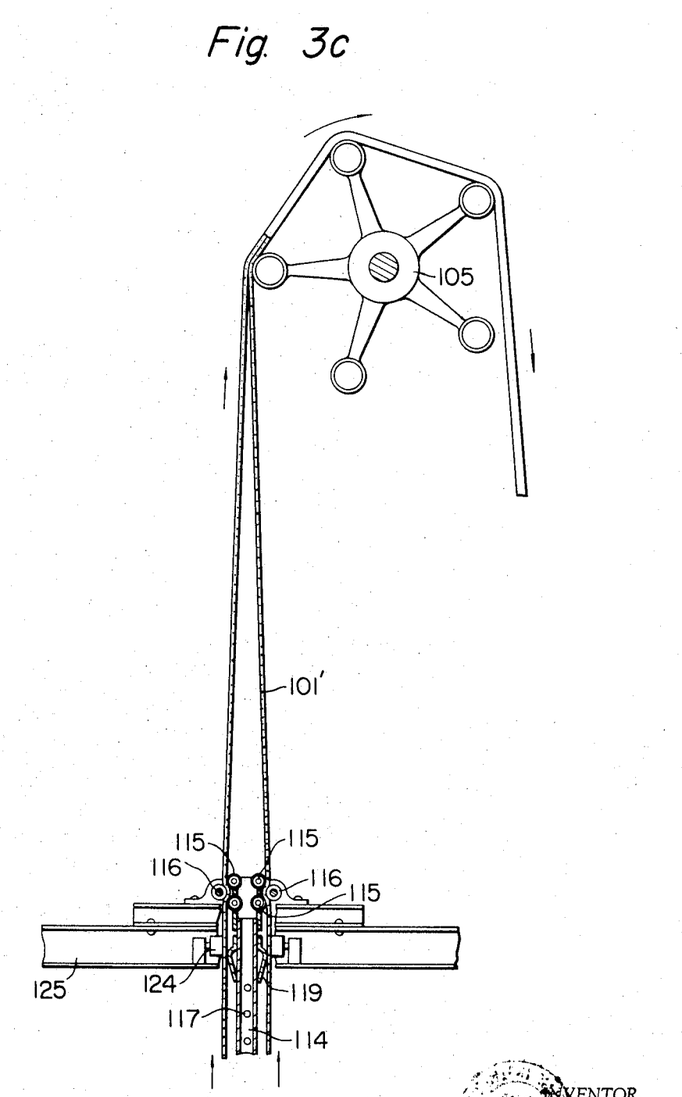
FIG. 3c is an enlarged cross-sectional view taken along generally from the line C–C' of FIG. 3.

As shown in FIGS. 3, 3a, 3b and 3c, the tubular fabric 101 is expanded by a depending guide cylinder 104 as it moves up the apparatus and is subjected to various treatment steps while being maintained in such an expanded state. After the tubular fabric has been subjected to predetermined various treatments, the fabric is formed into a desired product 101' and is then passed through a lobed wheel 105 disposed above the apparatus to a recoiler roll 126 to be rolled thereon. In FIG. 3a, 106 is a heater which is adapted to heat the outside of the tubular fabric 101 maintained in the expanded state by the guide cylinder 104, 107 is an annular guide member which is adapted to tightly pinch the heated tubular fabric 101 in cooperation with the guide cylinder 104 and which is provided with an annular deairing groove 108 in its inside. Air is exhausted from the deairing groove 108 through an exhaust pipe 109 which extends horizontally and outwardly from the member 107 and communicates with the deairing groove 108. 110 is a molten high polymeric compound reservoir positioned above the guide means 107 and the reservoir is communicated through a pipe 111 with a supply source (not shown). 112 is a cooling water reservoir which is adapted to prevent the guide cylinder 107 and high polymeric compound reservoir 110 from being excessively heated, 113 is a water pipe communicating the water reservoir 112 with a cooling water supply source (not shown), and 114 is an exhaust pipe whose lower end communicates with the upper end of the guide cylinder 104. As seen in FIG. 3c, pairs of upper and lower guide rollers 115 are provided at the upper end of the apparatus and these pairs of rollers 115 are adapted to contact the inside of the heat-treated tubular body 101' (a high polymeric compound tube whose wall has the tubular fabric incorporated therein) and to pinch the heat-treated tube in cooperation with a pair of guide rollers 116 which are disposed between each pair of guide rollers 115 at the upper end of the apparatus and are adapted to contact the outside of the treated tubular body 101'. The pairs of guide rollers also serve to hold the exhaust pipe 114 within the tubular body 101' and the guide cylinder 104. The exhaust pipe 114 is provided with a plurality of air holes 117 and as shown in FIG. 3b, vaporous gas generated within the tubular body 101' due to the heating of the body is exhausted through the exhaust pipe 114 and guide cylinder 104 out of the lower end 104' of the guide cylinder 104 and the gas is finally exhausted through the openings between the fibers of the tubular fabric, which has not yet been incorporated into the high polymeric compound, out to the open air. 119 is an annular member disposed in a proper position on the exhaust pipe 114 for preventing the uncompleted tubular body 101' from adhering to the outer surface of the exhaust pipe 114. 120 is a hot-air supply pipe communicating with a hot-air generator (not shown), 121 is a hot-air exhausting pipe and it is covered with an insulating material 122. 123 are air-velocity damping plates or dampers disposed in the hot-air inlet and a hot-air outlet, respectively, and 124 are rollers disposed below the support frame 125 of the support rollers 116 for preventing the exhaust pipe from moving laterally. With the above construction, a coarsely woven suitable tubular fabric 101 is supplied from the supply roll 127 in a flattened form through the guide rollers 102 and 103 into the apparatus. The fabric is expanded by the guide cylinder 104 as shown in FIGS. 3 and 3a into a cylindrical shape. The thus expanded fabric 101 is then heat-set and dried by the heater 106 and the dried fabric is then passed between the annular guide member 107 and the guide cylinder 104. After passing between the guide cylinder and member 107, the moisture contained in the fabric 101 is evaporated by heating of the fabric whereby the invasion of a high polymeric compound solution (a mixture solution of the invasion accelerator and high molecule compound having a suitable viscosity as already described) into the fabric the sliding of the fabric itself into the annular guide member 107 is facilitated. The tubular fabric 101 is deaired at the deairing groove 108 and the fabric is immediately introduced into the high polymeric compound reservoir 110 under a substantial vacuum, and accordingly, the tubular fabric 101 is impregnated with the high polymeric compound. Thus, the remaining air existing in the texture of the fabric as well as within the openings of the fabric can be almost completely exhausted whereby to effectively prevent formation of pin holes therein due to heat-treatment of the molten high polymeric compound. In this way, the tubular fabric 101 is impregnated with the high polymeric compound as the fabric passes through the reservoir 110, and thereafter, the fabric is introduced into the heater 118 when the fabric is heated and dried. The vaporous gas generated outside of the tubular body 101' during the heat-treatment is discharged via the exhaust pipe 121 whilst the gas and other impurities generated within the tubular body 101' are carried downwardly through the air holes 117 to the lower end of the guide cylinder 104 from where they are discharged via the inlet 104' and finally dissipated to the atmosphere through the openings between the fibers of the tubular fabric which is not yet impregnated with high polymeric compound. The heat treated and dried tubular body 101' is passed through the heater 118 to the guide rollers 115 and 116 and then is guided to the rotary lobed wheel 105. After passing around the wheel 105, the tubular body 101' is rolled on the take-up or recoiler roll 126. In this way, the tubular fabric 101 which has been coarsely woven is impregnated with an invasion accelerator during the successive heat-setting, drying and deairing treatments so that the tubular fabric 101 may easily slip into the annular guide member 107, and furthermore, the tubular fabric is impregnated with a high polymeric compound solution having a suitable viscosity and dried in a continuous manner. In the first step of heating, the tubular fabric is dehydrated so that the fabric may easily slip into the annular guide member and in the second deairing step, the tubular fabric is evacuated to such a degree that the molten high polymeric compound may be easily absorbed into the tubular fabric body whereby a desired synthetic tubular product is obtained while eliminating the formation of pin holes. The gas generated within the tubular body is dissipated through the exhaust pipe to the atmosphere and the tubular fabric is concentrically incorporated in a desired position within the tubular high molecule compound body, and the inner and outer surfaces of the thus obtained synthetic tubular product can be further smoothened. Therefore, a continuous synthetic tubular body having a fine quality and durability can be easily and rapidly produced.

Figure 4:
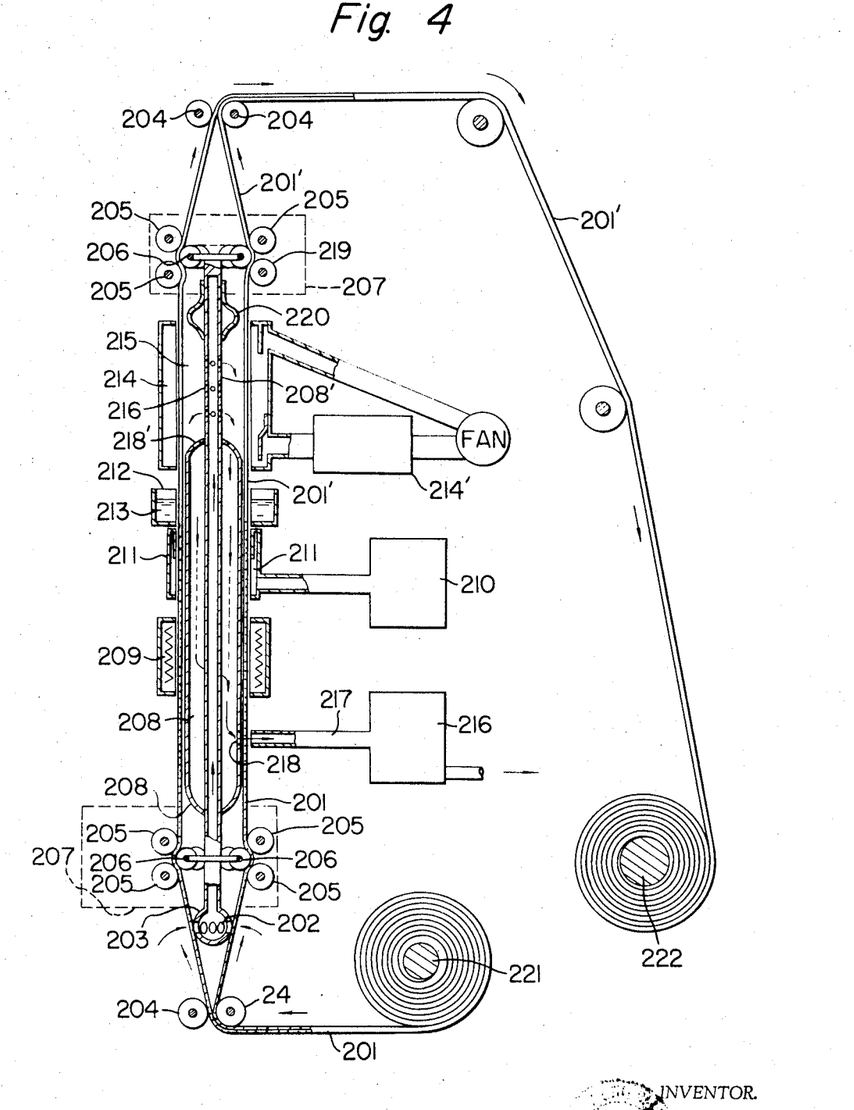
FIG. 4 is a vertical sectional view of a further modified apparatus for carrying out the second method of the present invention.

FIG. 4 shows a further modified embodiment of the apparatus for carrying out the second method in which a control device is employed in conjunction with the synthetic tube forming apparatus. The apparatus of this figure and the method which is carried out employing the apparatus have been described in our co-pending Japanese patent application No. 51,029/1964 filed on Sept. 10, 1964. In this figure, 221 is a delivery roll and 222 is a recoiler roll. A length of tubular fabric 201 is supplied from the supply roll 221 to the apparatus to be processed therein and the processed tubular fabric is rolled on the recoiler roll 222. 204 are pairs of guide rollers disposed above and below the apparatus, respectively. The tubular fabric 201 from the delivery roll 221 is passed between the lower pair of guide rollers 224, and then between inner and outer roller assemblies 205 and 206 of a support mechanism positioned at the lower end of the apparatus. Thereafter, the tubular fabric 201 is expanded to a full circular shape by an expander or guide cylinder 208 supported by the support mechanism 207 (such a support mechanism may be provided both at the upper end and the lower end of the apparatus or only at the lower end) and is moved to a heater-drier 209 in such an expanded state so as to dehydrate the fabric. After the dehydration, the tubular fabric is passed through an annular zone 211 which communicates with a vacuum pump 210 so that the air and other impurities in the texture of the fabric can be perfectly removed. Immediately after the fabric has passed through the annular zone 211, the fabric is passed through a reservoir 212 containing a solution of high polymeric compound 213 so as to impregnate the solution into the fabric 201. The thus high polymeric compound impregnated tubular fabric has a desired wall thickness because the space between the expander 208 and the reservoir 212 has been previously set to a desired size, and the viscosity of the high polymeric solution and the rate at which the fabric 201 passes through the apparatus has been controlled so as to obtain the desired thickness for the wall of such a tubular body. Thus, the fabric 201 is fully impregnated with high polymeric compound in this reservoir zone of the apparatus so that a synthetic tubular product 201' having a desired wall thickness can be obtained. The thus obtained synthetic tubular body 201' is then passed through a heating zone 214 where the tubular body is heat-treated and dried and is further passed through an upper support mechanism 207 which has other sets of roller assemblies 205 and 206, which in turn support the expander cylinder 208, an air pipe 208', a guide ring 220 and an air intake pipe 203. The synthetic tubular product is finally guided through rollers 204 to the recoiler roll 222. As shown in FIG. 4, the heating zone 214 is connected to an air heating device 214', and as the synthetic tubular high polymeric compound body 201' having a tubular fabric 201 incorporated therein passes through the heating zone 214, the incorporated tubular fabric can be concentrically disposed within the wall of the high polymeric compound tube body in any desired position therein by controlling a pressure difference between the inside and outside of the high polymeric compound tube and the temperature within the heating zone 214, and the inner and outer surfaces of the tube can be evenly smoothened. In FIG. 4, 203 is an air inlet pipe provided at the lower end of an air pipe 208' which extends within the expander pipe 208 along the axis of the expander pipe and the air inlet pipe 203 acts to expand the tubular fabric 201 and is provided with a group of air intake holes 202. The upper end portion of the air intake pipe 208 is provided with a group of air holes 216. Air passes through the air holes 218', the air hole 218" in the expander cylinder 208 and an exhaust opening 218 provided in the side of the lower portion of the expander cylinder 208 and is finally discharged carrying therewith vapour and gas generated during the heat treatment by means of a vacuum pump 216 to which an air intake pipe 217 extends from the opening 218. The pressure within the expander cylinder 208 and the evacuated space within the synthetic tubular body can be easily controlled depending upon the amount of the thus discharged air. If the pressure in the evacuated space within the synthetic tube under process is maintained lower than that on the outside of the tube by adjusting the vacuum action effected by the vacuum pump 216, the fabric in the high polymeric compound tube wall is moved toward the outer side of the wall so that the wall portion inwardly of the fabric may become thicker than the wall portion outwardly of the fabric resulting in an increased abrasion-resistance of the inner wall surface of the tube, as for conveying powderous materials through the tube. On the other hand, if the inner pressure is maintained higher than the outer pressure, the fabric moves toward the inner side of the high polymeric compound tube wall whereby to increase the thickness of the compound wall portion outwardly of the fabric resulting in an increased abrasion-resistance of the outer wall portion which is desirable for transportation of the tube. Thus, high polymeric compound can be easily positioned in the openings between the coarsely knitted or woven fibers of the fabric thereby to eliminate defects such as separation of the fabric from the high polymeric compound body which occurs in tubes of conventional type. Even if a synthetic tube is formed with a thin wall, the inner and outer surfaces of the tube can be easily formed smooth or rugged without sacrificing the strength of the synthetic tube. The synthetic tube emerges from the heating device 214 as a completed tubular product and passes through the upper support mechanism 219 and through the guide rollers 204 to the recoiler roll 222 on which the tubular product is rolled.

Figure 5:
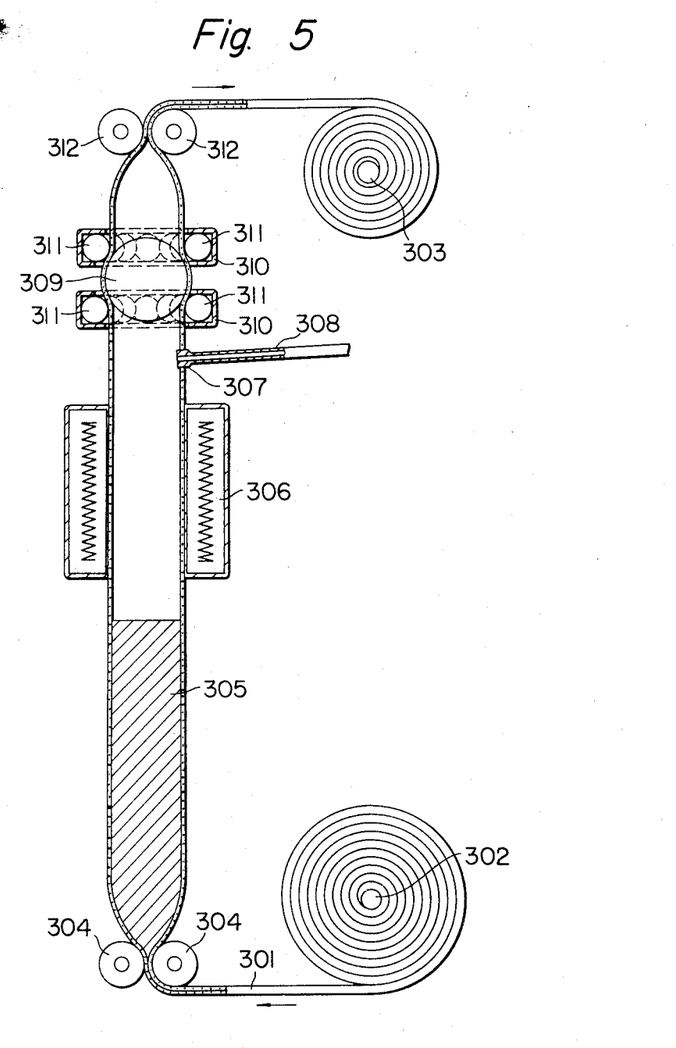
FIG. 5 and FIG. 6 are schematic views of different types of modified apparatus suitable for carrying out the second method of the present invention.

FIG. 5 shows a further modified apparatus for the second method of the present invention. In this figure, 301 is a tubular fabric which is supplied from a supply roll 302 and is rolled on a recoiler roll 303 after the fabric has been subjected to necessary treatments as it passes through the apparatus. 304 are a pair of press rolls or guide rolls and the tubular fabric 301 from the supply roll 302 is compressed into a flattened state as it passes between the rollers 304 so that treatment liquid contained therein may be prevented from flowing downwardly. The treatment liquid is supplied by means of a nozzle 308 inserted in a suitable opening 307 formed in the fabric at a point above a heating mechanism 306. It is, of course, necessary that the movement of the fabric 301 is temporarily stopped while the liquid 305 is charged into the fabric tube 301. 309 is a spherical member borne by a plurality of smaller spherical members 311 which are in turn supported by frame members 310. As seen in this figure, the fabric is moved while being pinched between the spherical member 309 and smaller spherical members 311, that is, the spherical member 309 contacts the inner surface of the fabric and the smaller members 311 contact the outer surface of the fabric so that the fabric may be expanded and maintained in such a state. 312 are guide rollers for guiding the treated fabric to the recoiler roll 303.

In the operation of this modified embodiment, as the fabric is passed through the apparatus, the fabric movement is temporarily stopped every time the fabric has advanced a predetermined distance and a liquid intake hole 307 is formed at a point where the nozzle 308 is positioned, and thereafter a desired amount of treatment liquid 305 is introduced within the tubular fabric 301 at the intake hole 307. The liquid 305 is maintained therein as shown in FIG. 5 and the fabric 301 is again moved upwardly by the actuation of the recoiler roll 303 whereby the fabric is expanded due to the weight of the liquid 305 immediately after the fabric has passed between the roller 304 so that it has a circular cross section whilst the liquid 305 adheres to the inner surface of the fabric 301. Thereafter, the fabric is passed through the heating mechanism 306 and dried thereby. After passing through the heating mechanism 306, the fabric 301 maintains a hollow farm by virtue of the spherical member 309 and is then guided by the guide rollers 312 to the recoiler roll 303 where the fabric is rolled in a dried state. As the amount of the liquid 305 decreases, the movement of the fabric is stopped each time the fabric has advanced about 10 m, for example, and a new liquid intake hole 307 is formed in the fabric. The vaporous gas generated within the tubular fabric due to heating is discharged through the hole 307 and immediately after the discharge of the gas, the fabric is replenished with an additional amount of the liquid at the hole 307.

Figure 6:
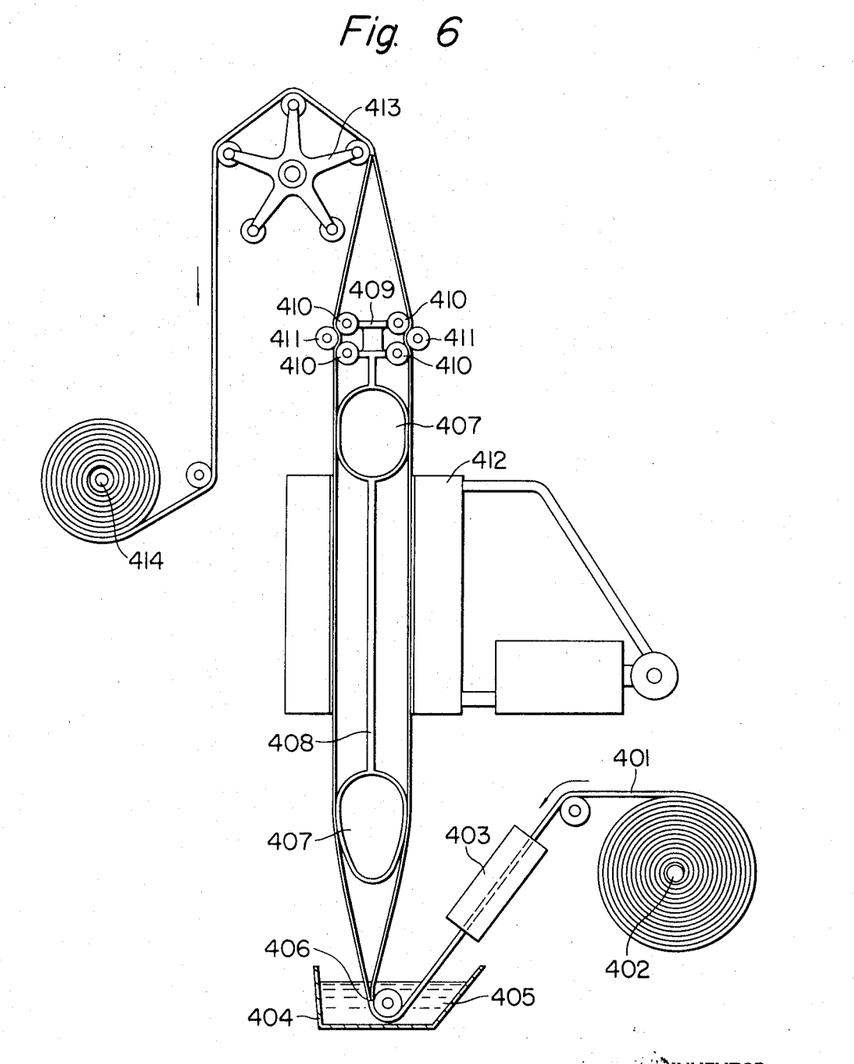

FIG. 6 shows a further modified apparatus for carrying out the second method of the present invention. In this figure, 401 is a length of tubular fabric which is supplied from a supply roll 402 on which the tubular fabric is rolled in a flattened state. 403 is a heating device which is adapted to heat the tubular fabric 401 in its flattened state as the fabric is reeled out from the supply roll 402 so as to remove moisture contained in the fabric 401. 404 is a reservoir containing synthetic resin solution 405 for treating the fabric 401 and the reservoir is provided with a roller 406 therein and the fabric 401 is guided around the roller 406 while the resin solution 405 is being applied thereon. 407 are expander members connected by a bar member 408 and these expander members are held by a roller support mechanism 409 in such a manner that they contact the inner surface of the fabric tube 401. The roller support mechanism 409 comprises roller assemblies 410 which are adapted to contact the inner surface of the fabric 401, and roller assemblies 411 which are adapted to contact the outer surface of the fabric. The first roller assemblies 410 are adapted to be supported by the second roller assemblies 411 with the fabric interposed therebetween. As shown, the tubular fabric 401 is upwardly guided between the roller assemblies 410 and 411. 412 is a heating device for drying the resin solution 405 and is adapted to dry the resin while the fabric is passing through the heating device. Accordingly, the resin will not adhere to the rollers when the fabric 401 passes between the roller assemblies 410 and 411. 413 is a lobed wheel for pulling the tubular fabric which has been processed and the wheel is adapted to rotate in a timed relation with the taking up action by the recoiler roll 414.

With the above construction, the fabric 401 is fully impregnated with the resin in the openings between the coarsely woven fibers as well as the inner and outer surfaces of the fabric as it passes through the resin reservoir 404 and the resin impregnated fabric is then moved upwardly while being maintained in its expanded state by means of the upper and lower expander members 407. Thereafter, the fabric is passed through the heating device 412 in the expanded state to be gradually dried thereby, and as a result, a tubular product having substantially smooth outer and inner surfaces can be obtained.

Although specific embodiments of the present invention have been illustrated and described herein, it will be understood that the same are merely exemplary of presently preferred embodiments capable of attaining the objects and advantages hereinbefore mentioned, that the invention is not limited thereto; variations will be readily apparent to those skilled in the art, and the invention is entitled to the broadest interpretation within the terms of the appended claims.

What is claimed is:

1. In a method of manufacturing a woven tube impregnated by a high polymeric compound, the steps of drying and deairing said tube so as to remove moisture and air from the woven tube material, impregnating the dried and deaired tube by a high polymeric compound, and then heating the impregnated tube while simultaneously controlling air pressure inside and outside the impregnated tube so as to permit the high polymeric compound to pass freely through the woven tube material.

2. The method as defined in claim 1 which is further characterized in that said tube consists of woven fiber material.

3. The method as defined in claim 2 which is further characterized in that said tube is dried and deaired under pressure.

4. The method as defined in claim 1 together with the additional step of mechanically expanding and smoothing the inside and outside of the tube subsequent to the heating step.

5. The method as defined in claim 2 which is further characterized in that said woven tube is formed by weaving the fiber material upon a preformed tubular body of a high polymeric compound.

6. The method as defined in claim 5 which is further characterized in that said drying and deairing step is performed on the fiber material preparatory to and during its weaving.

7. The method as defined in claim 6 which is further characterized in that fibers in the woven fiber material extend longitudinally and circumferentially of the tube.

8. In an apparatus for manufacturing a woven fiber tube impregnated by a high polymeric compound, the combination of means for drying tube fibers, means for removing fiber entrapped air by suction, means for impregnating a woven dried and deaired tube by a high polymeric compound, means for heating the impregnated tube, means operative concurrently with said heating means for controlling air pressure inside and outside the tube, and means operative between said drying means and said heating means for sustaining the tube in a tubular form.

9. The apparatus as defined in claim 8 together with means for extruding a preformed tubular body of a high polymeric compound, and means for weaving dried and deaired fibers on said preformed body to form a woven tube, said weaving means being operative prior to said impregnating means.

References Cited

UNITED STATES PATENTS

| | | | |
|---|---|---|---|
| 2,767,431 | 10/1956 | Lau Barede | 156—244 |
| 2,763,316 | 9/1956 | Stahl | 156—149 |
| 3,159,183 | 12/1964 | Brumbach. | |
| 3,067,803 | 12/1962 | Fleury | 156—148 XR |

PHILIP DIER, *Primary Examiner.*

U.S. Cl. X.R.

156—156, 244, 393, 500; 117—94, 119; 118—214; 264—89